United States Patent

Matsuda et al.

[11] Patent Number: 5,851,428
[45] Date of Patent: Dec. 22, 1998

[54] PHOSPHOR AND MANUFACTURING METHOD THEREOF

[75] Inventors: Naotoshi Matsuda, Machida; Masaaki Tamatani, Fujisawa; Miwa Okumura, Kawasaki; Keiko Albessard, Yokohama; Kazuhiro Kawasaki, Fujisawa; Seiji Yokota; Shinjiro Motoki, both of Hiratsuka; Yoshiaki Inoue, Atsugi, all of Japan

[73] Assignees: Kabushiki Kaisha Toshiba, Kawasaki; Neturen Co., Ltd., Tokyo, both of Japan

[21] Appl. No.: 816,675

[22] Filed: Mar. 13, 1997

[30] Foreign Application Priority Data

Mar. 15, 1996 [JP] Japan .................. 8-059156

[51] Int. Cl.$^6$ .................. C09K 11/08
[52] U.S. Cl. .......... 252/301.4 R; 252/301.4 F; 264/21
[58] Field of Search ........ 252/301.4 R, 30.4 F; 264/21

[56] References Cited

U.S. PATENT DOCUMENTS 5,644,193  7/1997  Matsuda et al. .................. 313/486

FOREIGN PATENT DOCUMENTS 221562    5/1987  European Pat. Off. .
62-201989 9/1987  Japan .

OTHER PUBLICATIONS

J. Electrochem. Soc.: Solid–State Science and Technology, vol. 123, No. 10, pp. 1493–1497, Oct. 1976, S. Ignasiak, et al., "Line Emission Penetration Phosphors: Preparation and Cathodolumniescent Properties".

*Primary Examiner*—Melissa Bonner
*Attorney, Agent, or Firm*—Oblon, Spivak, McClelland, Maier & Neustadt, P.C.

[57] ABSTRACT

A raw material prepared by washing a phosphor powder containing a phosphor host material and an activator with an acid solution, followed by drying the washed powder, is heated within a thermal plasma at a temperature which permits partially melting the phosphor, followed by cooling and subsequently subjecting the resultant phosphor at 1200° to 1700° C., thereby manufacturing spherical phosphor particles having a concentration gradient in a radial direction.

9 Claims, 4 Drawing Sheets

PHOSPHOR AND MANUFACTURING METHOD THEREOF

BACKGROUND OF THE INVENTION

The present invention relates to a phosphor and a method of manufacturing the phosphor.

Phosphor used in a cathode ray tube or in a fluorescent lamp is required to have a particle size of several microns in view of the emission efficiency achieved when the phosphor is excited by an electron beam or ultraviolet light. A synthetic method by means of a solid phase reaction using a flux is employed in general for the manufacture of a phosphor consisting of crystal grains having a grain size of the level noted above. However, the synthetic method exemplified above fails to produce a completely spherical phosphor. In general, the produced phosphor is rendered polyhedral depending on the shape of the raw material powder and crystal structure. Where such a polyhedral phosphor is used for the manufacture of, for example, a phosphor screen of a cathode ray tube, the light emitted from the phosphor screen upon excitement with an electron beam is not necessarily utilized sufficiently as a light output from the phosphor screen. To be more specific, if the shape of phosphor particles is close to a polyhedron, voids are formed in the phosphor screen prepared by using the phosphor particle, resulting in failure to obtain a dense phosphor film.

In addition, an aluminum backing used as a light reflecting film is roughened. As a result, an irregular reflection of the light emitted from the phosphor screen is promoted, leading to a loss of light. Likewise, where polyhedral phosphor particles are used in a fluorescent lamp, it is impossible to obtain a dense phosphor film, resulting in failure to utilize sufficiently the light emitted from the phosphor upon excitement with an ultraviolet light. What should be noted is that the phosphor particles should desirably be spherical in order to suppress scattering of light emitted from the phosphor film and to obtain a dense phosphor film.

A method for obtaining spherical phosphor particles is disclosed in, for example, Japanese Patent Disclosure (Kokai) No. 62-201989, which is equivalent to Japanese Patent Publication (Kokoku) No. 7-45655. According to the disclosure, raw material phosphor floating or falling within a high temperature plasma is heated to a temperature high enough to melt the surfaces of the raw material particles, followed by cooling so as to obtain desired spherical phosphor particles. It is also taught that a high frequency thermal plasma is used as a high temperature plasma. Additional teachings include, for example, an idea of granulating the raw material, an idea of imparting an electric charge to the raw material powder in order to prevent aggregation of the raw material supplied to the manufacturing apparatus, and an idea of using a dispersing agent such as polyammonium acrylate or a binder such as polyvinyl alcohol for dispersion of a fine granular raw material or for the coating with an activator. Further, it is described that the phosphor particles produced by the particular method are transparent and substantially spherical, with the result that the phosphor screen prepared by using the particular phosphor particles exhibits an excellent luminance and a good contrast. However, the method disclosed in this prior art has been found to give rise to various problems, as described below.

First of all, in the case of using a phosphor raw material consisting of only a phosphor host material and an activator, the resultant phosphor particles were found to have a diameter of 30 μm or more in Example 1 in Table 1 of the Japanese patent document quoted previously. This clearly support that it is impossible to obtain practically useful phosphor particles having a diameter of 0.5 to 15 μm by the method disclosed in the prior art in the case of using only a phosphor host material and an activator as a phosphor raw material. On the other hand, the Japanese patent document also teaches that a phosphor host material and an activator are dispersed by using a dispersing agent, and the surface of the phosphor host material is coated with the activator by using a binder so as to prepare a phosphor raw material. Table 2 of the document shows that the phosphor particles obtained by using the phosphor raw material noted above have a diameter of 10 μm or less (see Example 3). However, the present inventors have found experimentally that, in the case of using organic materials such as the dispersing agent and binder, the resultant phosphor is colored and rendered poor in luminance compared with the commercially available phosphor. In addition, it is difficult to control strictly the composition of the phosphor in the case of employing the method disclosed in the document, giving rise to serious problems. For example, other phases tend to be formed in the produced phosphor in addition to the desired phosphor phase. Further, it is possible for the produced phosphor particles to be different from each other in the concentration of the activator.

It is also difficult to obtain spherical phosphor particles of good characteristics in the case where phosphor having a complex composition such as oxysalt compound or complex oxide is processed by using a thermal plasma. Specifically, when phosphor particles of the complex composition are brought into contact with a high temperature plasma, a component of the phosphor host material is evaporated and decomposed, giving rise to formation of other phases of different composition. It follows that it is difficult to obtain a phosphor of a desired composition, leading to coloration and lowered luminance of the phosphor.

As already pointed out, the Japanese patent document also teaches an idea of electrically charging the raw material powder for smoothly supplying the raw material into the manufacturing apparatus by separating the particles from each other. In this case, however, a special apparatus, i.e., an electrostatic high voltage generator, is required for charging the raw material powder. In addition, because the passageway of the raw material powder such as a resin pipe or a metal pipe is charged by the friction when the raw material powder is supplied into the thermal plasma together with a carrier gas, the charging effect of the raw material powder is failed. As a result, plugging of the raw material powder takes place, making it impossible to maintain the initial powder supply rate. It follows that the total processing amount cannot be increased, even if the processing is performed for a long time.

As described above, it is certainly possible to obtain substantially spherical phosphor particles by the conventional method utilizing a thermal plasma. However, the conventional method is unsuitable for the manufacture of practically useful phosphor particles of a high luminance having a particle diameter of 0.5 to 15 μm with a high yield.

Contribution to the light emission from the surface region of the phosphor particle is larger than that from inner region of the phosphor particle. Therefore, if the activator concentration is high enough on the phosphor surface region, it is considered possible to obtain sufficient light emission characteristics even if the concentration of the activator is somewhat low in the inner region of the phosphor particle. In this case, the amount of the costly activator can be decreased as a whole, leading to a cost reduction.

It should be noted in this connection that the activator concentration on the surface region can be controlled, if an activator is deposited on the surface of the phosphor particle prepared by a flux method, followed by baking again the resultant phosphor. However, it is impossible to obtain substantially spherical phosphor particles by the flux method, leading to difficulties such as failure to obtain a dense phosphor film and an irregular light reflection, as already pointed out. It follows that it is difficult to obtain a phosphor screen of a high luminance when the phosphor particles prepared by the conventional method are used for the manufacture of a cathode ray tube or a fluorescent lamp.

BRIEF SUMMARY OF THE INVENTION

An object of the present invention is to provide a phosphor consisting of phosphor particles, which are shaped substantially spherical and have an average particle diameter of several microns, the phosphor being capable of forming a dense and homogeneous phosphor screen of a high luminance when used in the manufacture of a cathode ray tube or a fluorescent lamp. Another object is to provide a method of manufacturing the particular phosphor with a high yield.

The phosphor of the present invention consists of spherical particles having an average diameter of 0.5 to 15 $\mu$m, and a ratio of the longer diameter to the shorter diameter (aspect ratio) of 1.0 to 1.5, the concentration of at least one element contained in the phosphor host material or at least one element contained in the activator having a gradient in a radial direction of the spherical particle.

For example, there is exemplified a phosphor in that the concentration of the activator in a surface region within 0.1 $\mu$m from the particle surface is higher by at least 20% than that in the inner region of the phosphor particle.

Also, there is exemplified a phosphor in that the difference in metal ion molar ratio between the surface region within 5% from the surface of the particle diameter and the stoichiometric metal ion molar ratio of the desired phosphor is 30% or less, and the difference in metal ion molar ratio between the inner region of the phosphor particle and the stoichiometric metal ion molar ratio of the desired phosphor is 50% or more.

A method of the present invention for manufacturing a phosphor comprises the steps of:

heating a raw material consisting of a phosphor powder containing a phosphor host material and an activator within a thermal plasma at a temperature which permits partially evaporating a component of the raw material, followed by cooling to obtain spherical phosphor particles; and subjecting the resultant spherical phosphor particles to a heat treatment at 1200° to 1700° C.

Another method of the present invention for manufacturing a phosphor comprises the steps of:

heating a raw material consisting of a phosphor powder containing a phosphor host material and an activator within a thermal plasma at a temperature which permits partially evaporating a component of the raw material, followed by cooling to obtain spherical phosphor particles; and mixing fine particles of an oxide of a component of the phosphor host material with the resultant spherical phosphor particles, followed by subjecting the resultant mixture to a heat treatment at 1200° to 1700° C.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The raw material used in the manufacture of the phosphor of the present invention should contain a host material and an activator equal to those of the desired phosphor. Naturally, the raw material should not contain compounds other than those constituting the desired phosphor of the present invention. For example, the raw material should not contain a dispersing agent and a binder, though some impurities may be unavoidably contained in the raw material. It should be noted in this connection that it is not necessary for the concentration of the activator in the raw material to be equal to that in the product phosphor. Also, when the phosphor host material is a multicomponent compound, it suffices that the species of the elements contained in the raw material coincide with that of the product phosphor. Therefore, it is not necessary for the composition of the raw material to be equal to that of the product phosphor.

In the method of the present invention for manufacturing a phosphor, the raw material phosphor powder is treated with a thermal plasma, followed by further subjecting the resultant phosphor to a heat treatment at 1200° to 1700° C. The heat treatment at the high temperature permits bringing the phosphor characteristics lowered by the treatment within a thermal plasma back to the good characteristics. For example, if a terbium-activated yttrium aluminum garnet phosphor is produced by treatment with a thermal plasma, other phases are formed in the phosphor. However, the other phases content can be effectively lowered by subjecting the phosphor obtained after the plasma treatment to a heat treatment at 1200° to 1700° C. The heat treatment also permits effectively eliminating the coloring of the phosphor caused by the defect taking place during treatment with the thermal plasma. The heat treatment is preferably performed within a temperature range of 1300° to 1600° C.

When the phosphor host material is a multicomponent compound that the composition thereof is varied by the treatment with a thermal plasma, it is effective to use a method of heating a raw material consisting of a phosphor powder containing a phosphor host material and an activator within a thermal plasma at a temperature which permits partially evaporating a component of the raw material, followed by cooling to obtain spherical phosphor particles, and then mixing fine particles of an oxide of a component of the phosphor host material with the resultant spherical phosphor particles, followed by subjecting the resultant mixture to a heat treatment at 1200° to 1700° C. A preferred heat treating temperature falls within a range of 1300° C. to 1600° C.

The method described above is effective when employed for the manufacture of a phosphor having a complex composition such as an oxysalt compound or a complex oxide. To be more specific, this method is effective for improving the characteristics of the phosphor represented by a general formula given below:

$$Ln_3M_5O_{12}:R \text{ or } Ln_2SiO_5:R$$

where Ln is at least one element selected from the group consisting of Y, Gd, La and Lu; M is at least one element selected from the group consisting of Al and Ga; and R is at least on element selected from the group consisting of lanthanide series, Cr, Ti and Fe.

Incidentally, where the ordinary phosphor prepared by the flux method is subjected to a heat treatment at 1200° to 1700° C., grain growth or sintering of adjacent phosphor particles takes place, leading to an impaired dispersion capability of the phosphor particles. However, when it comes to the spherical phosphor particles prepared by the treatment with a thermal plasma, a noticeable sintering does not take place even by the heat treatment at such a high temperature as 1200° to 1700° C., though sintering certainly takes place if the heat treating temperature exceeds 1700° C.

In the present invention, it is desirable to wash the raw material phosphor powder with an acid before treatment with a thermal plasma. The present inventors have found that the washing with an acid permits modifying the surface state of the raw material powder so as to increase the fluidity of the powder, permits efficiently dispersing the powder in a carrier gas, permits preventing the powder from being attached to a powder supply passageway, and also permits keeping constant the raw material supply rate in the step of the treatment with a thermal plasma.

It is desirable to use hydrochloric acid for washing the raw material powder. It is also possible to use carboxylic acids such as formic acid, acetic acid, butyric acid, palmitic acid, stearic acid, acrylic acid, methacrylic acid, oleic acid, linolic acid, linolenic acid, oxalic acid, adipic acid, maleic acid, fumalic acid, lactic acid, malic acid, tartaric acid, benzoic acid, salicylic acid, phthalic acid, propionic acid, isobutyric acid, valeric acid, pivalic acid, lauric acid, myristic acid, propiolic acid, and crotonic acid. The acid concentration, which depends on, for example, the washing time and temperature, should fall within a range of between 0.01 and 1N.

In the method of the present invention for manufacturing a phosphor, the supply rate of the raw material phosphor to a thermal plasma should desirably fall within a range of between 2 and 50 g/min. If the supply rate is lower than 2 g/min, it is impossible to obtain a sufficiently large amount of the product phosphor particles even if the heat treatment is carried out for a long time, leading to a high manufacturing cost. In addition, a larger proportion of the raw material powder is evaporated to form fine particles, leading to a further decreased amount of the spherical phosphor particles. On the other hand, if the supply rate is higher than 50 g/min, the actual supply rate to a thermal plasma is fluctuated, resulting in an increased amount of the phosphor particles which are not shaped completely spherical or in an increased density of the raw material powder to form an aggregated state. It follows that the resultant phosphor particles are rendered greater than expected or plugging is brought about, leading to an unstable manufacture of the phosphor. It is also desirable for the electric power for generating a thermal plasma to fall within a range of between 5 and 100 kW. Where the power is lower than 5 kW, particles which are not shaped spherical are contained in a greater amount in the resultant phosphor. Also, the generated plasma is rendered less stable. On the other hand, where the power is higher than 100 kW, a larger proportion of the raw material powder is evaporated to form fine particles, leading to a smaller proportion of spherical particles having a desired particle diameter.

The phosphor of the present invention manufactured by the method described above has an average particle diameter falling within a range of between 0.5 and 15 μm. If the phosphor having an average particle diameter smaller than 0.5 μm is used for the manufacture of a phosphor screen included in, for example, a cathode ray tube, the light scattering within the phosphor screen is promoted. In other words, the light emitted from the phosphor screen cannot be utilized effectively, leading to a low luminance of the phosphor screen. If the phosphor having an average particle diameter larger than 15 μm is used for the manufacture of a phosphor screen of, for example, a cathode ray tube, however, it is impossible to obtain a high resolution.

It should also be noted that the phosphor of the present invention consists of transparent spherical particles. The term "spherical particle" used herein should be interpreted to denote a particle having a surface roughness not greater than a level of a wavelength of light, and also having an aspect ratio not larger than 1.5. In addition, the term "transparent particle" used herein should be interpreted to denote that pores, interfaces, heterogeneous phases, etc., which perform an interaction with light, are not present inside the phosphor particle.

Further, in the phosphor of the present invention, the surface region of the phosphor particle should differ from the inner region in the concentration of at least one element contained in the phosphor host material or at least one element contained in the activator.

In the phosphor of the present invention, the mechanism of bringing about the difference in the concentration of the activator between the surface region and the inner region of the phosphor particle is considered to be as follows. Specifically, if the raw material powder is heated by a thermal plasma at a temperature which permits partially melting the raw material powder, fine particles having a high concentration of the activator are attached to the surface of the phosphor particle. If the resultant phosphor particles are subjected to a heat treatment in the subsequent step at 1200° to 1700° C., the fine particles attached to the particle surface are fused to the surface of the phosphor particle so as to increase the concentration of the activator in the surface region of the phosphor particle. Note that only a small region on the surface of the phosphor particle is covered with the fine particles having a high concentration of the activator. If the heat treatment is performed at temperatures lower than 1200° C., these fine particles fail to be diffused sufficiently, making it impossible to increase the concentration of the activator over the entire surface region of the phosphor particle. Therefore, the concentration of the activator in the entire phosphor particle including the inner region of the particle is required to be made optimum, leading to an increased amount of the costly element used as the activator. On the other hand, if the heat treatment is carried out at temperatures higher than 1700° C., the adjacent phosphor particles are sintered together, with the result that the produced phosphor particles are rendered unsatisfactory in dispersion capability and shape, i.e., non-spherical particles, as already pointed out.

According to the above method, there is provided a phosphor in which the concentration of the activator in the surface region of the phosphor particle within 0.1 $\mu$m from the surface is higher by at least 20% than that in the inner region of the phosphor particle. It should be noted in this connection that, when excited by an electron beam, the light emission from the surface region of the phosphor particle much contributes to the luminance of the phosphor screen. It follows that, if the surface region of the phosphor particle has an optimum concentration of the activator, satisfactory light emission characteristics such as the emission color and luminance can be maintained even if the concentration of the activator is somewhat low in the inner region of the phosphor particle. In other words, since sufficient light emission characteristics can be obtained even if the amount of the costly activator is decreased as a whole, the manufacturing cost of the phosphor can be reduced. However, if the activator concentration in the surface region exceeds 15 wt %, the emission characteristics are lowered due to concentration quenching.

Further, in a light emission display such as a field emission display or a plasma display, employed is an exciting method in which the phosphor material used has a large absorption coefficient of an exciting energy. In this case, the surface region of the phosphor particle contributes mainly to the light emission. Under the particular exciting condition, the activator in the inner region of the phosphor particle hardly contributes to the light emission. Moreover, if the concentration of the activator is unduly high in the inner region of the phosphor particle, ions of the activator are likely to interact with each other so as to inhibit the light emission. On the other hand, where the phosphor has a high concentration of the activator in the surface region of the phosphor particle, a sufficient light emission can be obtained from the surface region while suppressing the light loss in the inner region. As a result, the luminance of the light emitting display can be improved.

In the phosphor of the present invention, the mechanism of bringing about a distribution in a ratio of the metal ions constituting the phosphor host material between the surface region and inner region is considered to be as follows. Suppose a desired phosphor has a complex composition. If the raw material is brought into contact with a plasma having a temperature reaching thousands of ° C. to 10,000° C., some of the elements constituting the phosphor host material, particularly, an element having a high vapor pressure, is evaporated. As a result, some phenomena take place in the produced phosphor particles including decomposition, change in composition, and formation of other phases. Since evaporation of an element takes place while the particles are fused, heterogeneous phases exist uniformly over the entire region of the resultant spherical particle. On the other hand, the evaporated element is cooled so as to be collected separately in the form of fine particles.

When it comes to, for example, $Y_3(Al, Ga)_5O_{12}$:Tb phosphor, a stoichiometric molar ratio of (Y+Tb)/(Al+Ga) is 3:5. However, the phosphor produced by the thermal plasma treatment also contains other phases having the molar ratio noted above of 1:1 or 1:2. Formation of these other phases is considered to be brought about mainly by the fact that gallium tends to be evaporated more easily than the other elements contained in the phosphor.

The presence of the other phases noted above gives rise to coloration or reduction in luminance and, thus, is undesirable in terms of the light emitting characteristics of the phosphor. For avoiding formation of these other phases, it is considered desirable to lower the power of plasma so as to perform the thermal plasma treatment under conditions effective for preventing the other phases formation. If the plasma power is lowered, however, it is difficult to obtain spherical phosphor particles.

In the present invention, for eliminating the generated other phases, fine particles of oxide of deficient element are added to the spherical particles obtained after the thermal plasma treatment, followed by subjecting the resultant mixture to a heat treatment so as to bring about chemical reactions and, thus, to adjust the molar ratio of the metal elements in the surface region of the spherical particles.

The particular method permits a difference in the metal ion ratio between a surface region of the phosphor particle within 5% from the surface of the particle diameter and the stoichiometric metal ion ratio of the phosphor not to exceed 30%, and also permits a difference in the metal ion ratio between the inner region of the phosphor particle and the stoichiometric metal ion ratio to exceed 50%. The metal ion ratio in the surface region may be coincident with the stoichiometric metal ion ratio of the desired phosphor.

In this case, the elements of the fine particles are diffused uniformly into the spherical particles so as to carry out recombination reactions and, thus, to recover a predetermined stoichiometric molar ratio of the metal elements. In order to allow the fine particles to perform the above-noted function satisfactorily, the fine particles should desirably have a particle diameter as small as possible. Specifically, the average particle diameter should be at most 1 $\mu$m, preferably at most 0.5 $\mu$m. In the case of using the fine particles specified above, the reaction temperature can be lowered, and the reaction time can be shortened. In addition, the reaction proceeds uniformly. If the average particle diameter of the fine particles is larger than the value specified above, the probability of sintering among phosphor particles is made greater than the probability of the recombination reaction noted above.

The amount of the fine particles added to the spherical particles can be determined on the basis of a powder X-ray diffraction (XRD) pattern. To be more specific, the amount of the fine particles can be determined on the basis of a ratio of main peak value of a desired phosphor to a main peak value of the other phases. It should be noted that the characteristics of the resultant spherical phosphor particles such as the particle diameter and kind and proportion of the other phases are dependent on the conditions of the thermal plasma treatment such as the powder supply rate, kind and supply rate of a plasma gas, and power, and also on the characteristics such as the composition, diameter and shape of the particle, and fluidity of the raw material powder. It follows that it is desirable to determine the kind and amount of the fine particles every time the fine particles are added to the spherical particles. It is possible to use the fine particles collected separately from the spherical particles. However, it is desirable to use a commercially available reagent containing the elements to be added. In order to allow the fine particles to be attached uniformly to the surface of the spherical particle, it is desirable to disperse the fine particles sufficiently, followed by mixing with the spherical particles within a bead mill or by stirring.

The heat treatment should desirably be carried out at 1200° to 1700° C. for 10 minutes to 30 hours. If the heat treatment is carried out at temperatures lower than 1200° C., the elements of the fine particles fail to be diffused sufficiently into the inner region of the spherical particles, with the result that it is impossible to eliminate effectively the other phases included in the spherical particle. If the heat treatment is carried out at temperatures exceeding 1700° C., however, adjacent spherical particles are sintered together, resulting in failure to obtain spherical particles, though the elements of the fine particles can certainly be diffused sufficiently into the inner region of the spherical particle. This is also the case with the heat treating time.

The metal ion ratio noted above is determined on the basis of groups of metal ions occupying the same sites. When it comes to, for example, an $Y_3(Al, Ga)_5O_{12}$:Tb phosphor, Y and Tb occupy the same site. Also, Al and Ga occupy the same site. In this case, the molar ratio of (Y+Tb)/(Al+Ga) is regarded as the metal ion ratio. In the $Y_3(Al, Ga)_5O_{12}$:Tb phosphor, the stoichiometric molar ratio of (Y+Tb)/(Al+Ga) is ⅗. In the present invention, the metal ion molar ratios in the surface region and inner region of the phosphor particle are actually measured so as to determine the differences from the stoichiometric molar ratio noted above.

The distribution in the concentration of the activator or the change in the chemical composition in the radial direction of the phosphor particle is determined as follows. For example, the phosphor particle is gradually dissolved by etching starting with the surface of the particle so as to subject the resultant solution to a quantitative analysis by means of, for example, ICP. In this method, the concentration of the activator or the chemical composition of the dissolved portion can be obtained by the quantitative analysis of the solution. At the same time, it is possible to estimate the thickness of the dissolved portion by measuring the change in weight accompanying the etching. It follows that it is possible to know the distribution in the concentration of the activator or change in composition of the phosphor particle by performing the etching and the analysis in several stages. Further, the distribution in the chemical composition within the phosphor particle can be measured by observation with an electron microscope equipped with an analyzer such as EDX (energy dispersive X-ray analysis). In this method, the distribution within individual particles can be measured, though the measuring accuracy is somewhat low.

EXAMPLES

In the Examples described below, phosphors were manufactured by using an apparatus shown in FIG. 1. As is shown in the drawing, the apparatus comprises a plasma gas supply cylinder 10, a powder feeder 11 prepared by improving an electromagnetic feeder, a carrier gas supply cylinder 12, a powder supply port 13 (nozzle structure being omitted), a high frequency power supply 14, a high frequency coil 15, a reaction vessel 17, a cyclone 18, a cylinder 19 covering a plasma generating section, and a cooling gas supply cylinder 20. In this apparatus, a plasma frame 16 is formed as shown in the drawing.

Example 1

A commercially available $Y_2O_3$:Eu phosphor was used as a raw material. The raw material phosphor was found to have an average particle size of 4.5 μm when measured by a Blaine method. On the other hand, a solution for washing the raw material powder was prepared by diluting a concentrated hydrochloric acid 60 times with an ion exchange water. The raw material powder was kept stirred for 20 minutes in the dilute hydrochloric acid solution, followed by washing, filtering and, then, drying.

Figure 1:
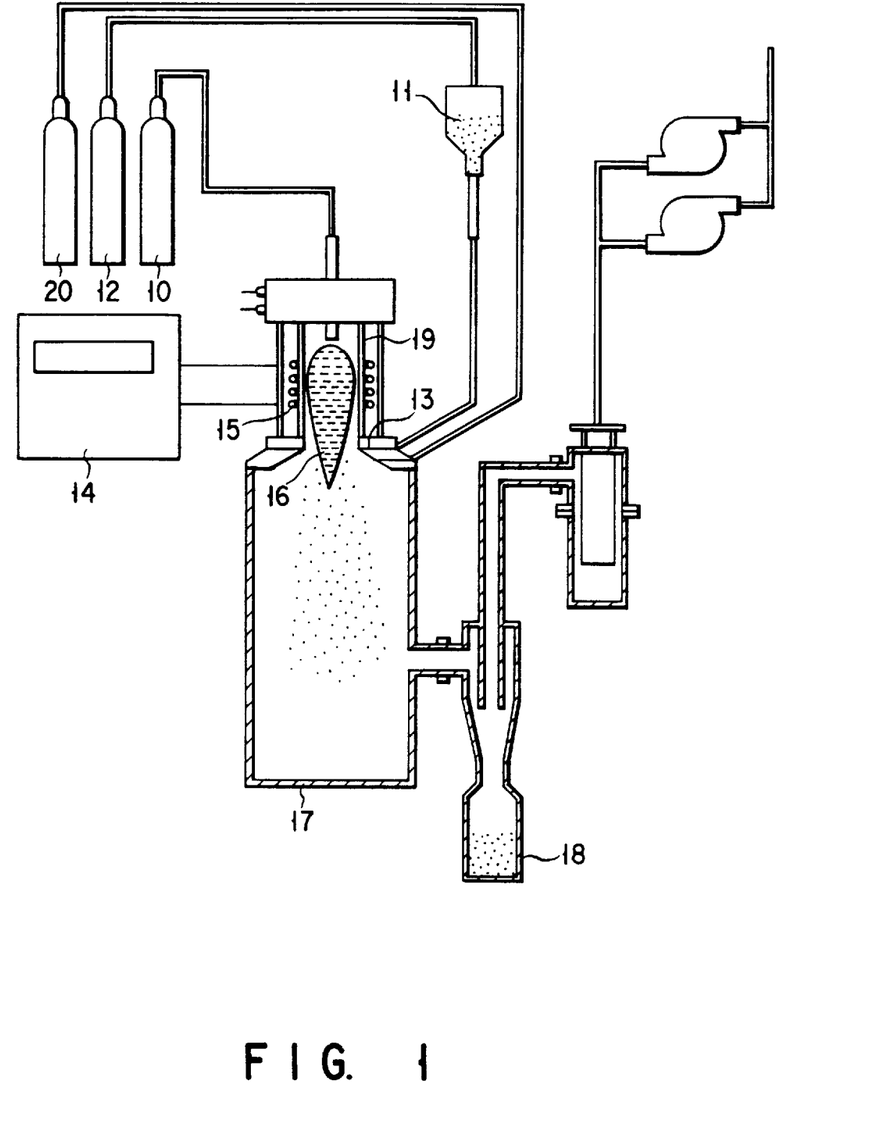
FIG. 1 schematically shows an apparatus used for manufacturing the phosphor of the present invention by the method of the present invention.

For the treatment of the raw material powder with a thermal plasma, an argon gas containing 15% of oxygen was supplied into the apparatus shown in FIG. 1, and a high frequency thermal plasma was generated under a frequency of 4 MHz and a power of 15 kW. The raw material powder washed in advance with the hydrochloric acid solution was dispersed in the argon gas supplied at a flow rate of 15 L/min so as to be supplied into the high frequency thermal plasma through four teflon tubes, each having an inner diameter of 2 mm, which were arranged in parallel. The thermal plasma treatment was performed for 60 minutes, with the supply rate of the raw material powder set at 10 g/min, so as to obtain 550 g in total of phosphor. Then, the resultant phosphor were put in an electric furnace so as to be subjected to a heat treatment at 1300° C. for 5 hours under the air atmosphere.

The phosphor thus prepared was excited by an electron beam under an accelerating voltage of 10 kV and a current density of 1 μA/cm² so as to measure the powder luminance, with the result that the luminance was found to be 103% of that of the raw material phosphor. Further, the phosphor was observed with an electron microscope. The phosphor particles were found to be substantially spherical, to have an average particle diameter of 6.0 μm, and to be suitable for use in the manufacture of a cathode ray tube or a fluorescent lamp.

Comparative Example 1—1

A commercially available $Y_2O_3$:Eu phosphor was used as a raw material as in Example 1. The raw material powder, which was not treated at all in advance, was subjected to a thermal plasma treatment by the method described in Japanese Patent Disclosure No. 62-201989 referred to previously, as follows.

Specifically, used in this method was an apparatus substantially equal to that shown in FIG. 1, except that an electrostatic high voltage generator was mounted around the teflon tubes connecting the powder feeder 11 and the reaction vessel 17. For the treatment of the raw material powder with a thermal plasma, an argon gas containing 15% of oxygen was supplied into the apparatus, and a high frequency thermal plasma was generated under a frequency of 4 MHz and a power of 15 kW. The raw material powder was dispersed in the argon gas supplied at a flow rate of 30 L/min so as to be supplied into the high frequency thermal plasma through four teflon tubes, each having an inner diameter of 2 mm, which were arranged in parallel. In this case, a voltage of −7 kV was applied to the electrostatic high voltage generator so as to charge the phosphor powder. The supply rate of the powder was set initially at 100 g/min. However, the powder supply rate to the thermal plasma was decreased soon after start up of the treatment, leading to incapability of continuing the thermal plasma treatment. As a result, the phosphor obtained after the thermal plasma treatment was found to be only 20 g in total. After the thermal plasma treatment, the teflon tubes for feeding the raw material powder were found to have been plugged.

The powder luminance of the resultant phosphor was found to be 90% of that of the raw material phosphor. Also, when observed with an electron microscope, the phosphor was found to contain at least 70% by volume of phosphor particles failing to meet the spherical particles defined in the present invention. The phosphor was also found to contain at least 20% by volume of phosphor particles having a particle size of at least 20 $\mu$m. Clearly, the phosphor obtained in this experiment is unsuitable for use in the manufacture of a cathode ray tube or a fluorescent lamp.

Comparative Example 1-2

An $Y_2O_3$:Eu phosphor equal to that used in Example 1 was used as a raw material. In this experiment, the raw material powder was granulated into particles having a size of 75 $\mu$m.

The granular raw material was supplied to a high frequency thermal plasma under the conditions equal to those in Example 1. To reiterate, the granulated raw material was supplied at a rate of 10 g/min so as to carry out the thermal plasma treatment for 60 minutes. As a result, 250 g in total of phosphor was obtained after the thermal plasma treatment.

The resultant phosphor was found to have been slightly colored gray. Also, the powder luminance was found to be as low as 60% of that of the raw material phosphor. Further, when observed with an electron microscope, the produced phosphor was found to have an average particle size of 62 $\mu$m. Clearly, the phosphor obtained in this experiment is unsuitable for use in the manufacture of a cathode ray tube or a fluorescent lamp.

Example 2

A commercially available $Y_3Al_5O_{12}$:Tb phosphor containing 3.8% by weight of Tb was used as a raw material. When measured by a Blaine method, the raw material phosphor was found to have an average particle size of 3.7 $\mu$m.

The raw material powder was subjected to a treatment with a thermal plasma as in Example 1, except that a pure argon gas was used as the plasma gas. To reiterate, a high frequency thermal plasma was generated under a high frequency of 4 MHz and a power of 15 kW. The raw material powder was dispersed in an argon gas flowing at a flow rate of 15 L/min so as to be supplied through four teflon tubes each having an inner diameter of 2 mm into the high frequency thermal plasma. The supply rate of the raw material powder was set at 10 g/min, and the thermal plasma treatment was carried out for 60 minutes.

The resultant powder was analyzed by an X-ray diffractometry. Diffraction lines denoting tetragonal $Y_3Al_5O_{12}$ phase, $YAlO_3$ phase, and $Y_4Al_2O_9$ phase were also found in addition to the cubic $Y_3Al_5O_{12}$ (C-YAG) phase of the raw material. The intensity of the main diffraction line of the $YAlO_3$ phase, which constituted the largest line among the other phases, was found to be substantially equal to that of the main diffraction line of the C-YAG phase. Further, the powder luminance was found to be 18% of that of the raw material phosphor, i.e., $Y_3Al_5O_{12}$:Tb.

In the next step, the phosphor after the thermal plasma treatment was put in an electric furnace so as to be subjected to a heat treatment at 1500° C. for 2 hours. The resultant phosphor was analyzed by an X-ray diffractometry. The X-ray diffraction intensity of the other phases was found to be less than 5% of the intensity of the main diffraction line of the C-YAG phase, supporting that substantially all the phases of the phosphor after the thermal plasma treatment were converted into $Y_3Al_5O_{12}$:Tb. When observed with an electron microscope, the resultant phosphor was found to have an average particle diameter of 6.2 $\mu$m and to contain about 97% by volume of the spherical particles defined in the present invention. Further, the powder luminance of the phosphor was found to have been recovered to reach 93% of that of the raw material phosphor.

Comparative Example 2

A raw material phosphor, in which the surface of a phosphor host material was covered with an activator by using a dispersing agent and a binder, was prepared by the method described in Japanese Patent Disclosure No. 62-201989 referred to previously. Specifically, an aqueous solution was prepared by dissolving 0.002 mol of terbium chloride in one liter of an ion exchange water, followed by dispersing 3 mols of yttrium oxide and 5 mols of alumina in the resultant aqueous solution. Further, 40% by volume of a polyammonium acrylate solution was added, in an amount of 0.01% by weight relative to the solid components of the dispersion, to the resultant dispersion. After stirred sufficiently, the resultant mixture was heated to remove the solvent, and the solidified material after drying of the residue was passed through a sieve of 500 meshes so as to obtain a raw material powder. The resultant raw material powder was subjected to a thermal plasma treatment under the conditions equal to those in Example 2.

The resultant powder was analyzed by an X-ray diffractometry. Diffraction lines denoting tetragonal $Y_3Al_5O_{12}$ phase, $YAlO_3$ phase, $Y_4Al_2O_9$ phase, and $Al_2O_3$ phase were also found in addition to the desired cubic $Y_3Al_5O_{12}$ (C-YAG) phase. It should be noted in particular that the intensity of the main diffraction line of the $YAlO_3$ phase was found to be 2.2 times as high as that of the main diffracting line of C-YAG phase, supporting that a considerably large amount of other phases were formed in the phosphor. Further, the powder luminance was found to be only 7% of that of the commercially available $Y_3Al_5O_{12}$:Tb phosphor.

Example 3 and Comparative Example 3

An $Y_2O_2S$:Eu phosphor containing 4.0% by weight of Eu was prepared by a flux method. The phosphor thus prepared was found to have an average particle size of 4.1 $\mu$m, when measured by a Blaine method. For washing the raw material powder, a solution was prepared by diluting a concentrated hydrochloric acid 60 times with an ion exchange water as in Example 1. The raw material powder was put in the dilute hydrochloric acid solution, which was kept stirred for 20 minutes, followed by filtering the dispersion and subsequently drying the residual powder so as to obtain a washed raw material. The raw material powder was subjected to a treatment with a thermal plasma as in Example 2, using the apparatus shown in FIG. 1. In this experiment, a pure argon gas was used as the plasma gas. To reiterate, a high frequency thermal plasma was generated under a high frequency of 4 MHz and a power of 15 kW. The raw material powder was dispersed in an argon gas flowing at a flow rate of 15 L/min so as to be supplied through four teflon tubes each having an inner diameter of 2 mm into the high frequency thermal plasma. The supply rate of the raw material powder was set at 10 g/min, and the thermal plasma treatment was carried out for 60 minutes, so as to obtain 500 g in total of powder.

The resultant powder, to which 5% by weight of sulfur was added, was subjected to a heat treatment for one hour under a relatively low temperature of 800° C. under an argon gas atmosphere so as to obtain a phosphor (Comparative Example 3). When observed with an electron microscope, fine particles having a diameter not larger than 0.2 μm were found to have been attached in a partially fused state to the surface of the phosphor particle. The light emitted from the resultant phosphor was found to be yellowish, compared with the light emitted from the commercially available $Y_2O_2S$:Eu phosphor containing 5.0% by weight of Eu.

On the other hand, the powder obtained after the thermal plasma treatment as in Comparative Example 3, to which was added 5% by weight of sulfur, was subjected to a heat treatment for 2 hours at 1400° C. so as to obtain a phosphor (Example 3). The resultant phosphor was found to have an average particle diameter of 4.8 μm. When observed with an electron microscope, the fine particles were found to have been disappeared substantially completely from the surface of the phosphor particle. To be more specific, the proportion of the fine particles was found to be only 2% or less. Also, the powder luminance of the resultant phosphor was as high as 102% of that of the phosphor used as the raw material.

In the next step, the phosphor particles obtained in Example 3 were gradually dissolved from the surface region in an acid, and the concentration of the rare earth element was measured successively in the dissolving process so as to estimate the distribution of the Eu concentration inside the phosphor particle. The Eu concentration in the surface region within 0.1 μm from the surface was found to be 5.2% by weight, and the Eu concentration in the inner region was found to be substantially constant at 2.1% by weight. In short, the concentration of the activator was found to be higher in the surface region of the phosphor particle. Further, the color of the light emitted from the phosphor when excited by an electron beam was found to be substantially equal to that of the light emitted from the commercially available $Y_2O_2S$:Eu phosphor.

Example 4

A commercially available $Y_2O_3$:Eu phosphor, having an average particle size of 4.5 μm as measured by a Blaine method, was used in this experiment. The particular phosphor was dispersed in 0.5N aqueous solution of acetic acid, followed by stirring the dispersion for 30 minutes. After the stirring operation, the dispersion was filtered, followed by washing the residual powder with a flowing water so as to obtain the raw material.

The raw material phosphor was subjected to a treatment with a thermal plasma. In this experiment, the raw material powder was dispersed in an argon gas flowing at a flow rate of 30 L/min so as to be supplied through four teflon tubes each having an inner diameter of 2 mm into a high frequency thermal plasma of 4 MHz and a power of 15 kW under an argon gas atmosphere containing 15% of oxygen. The phosphor amount was found to be 600 g in total after the treatment with the thermal plasma for 60 minutes. The teflon tubes for supplying the raw material into the reaction vessel were not found to have been plugged after the treatment. The phosphor particles obtained after the thermal plasma treatment were found to have an average particle diameter of 5 μm, and to contain as much as 98% of spherical phosphor particles meeting the definition of the present invention. The resultant phosphor was subjected to a heat treatment for 5 hours at 1300° C., as in Example 1. Then, the powder luminance was measured, which was found to be 101% of that of the raw material phosphor.

Example 5

A commercially available $Y_2O_3$:Eu phosphor having an average particle size of 4.2 μm as measured by a Blaine method was used in this experiment. The particular phosphor was dispersed in 0.1N aqueous solution of formic acid, followed by stirring the dispersion for 30 minutes. After the stirring operation, the dispersion was filtered, followed by washing the residual powder with a flowing water so as to obtain the raw material. The raw material powder was subjected to a treatment with a thermal plasma. In this experiment, the raw material powder was dispersed in an argon gas flowing at a flow rate of 30 L/min so as to be supplied through four teflon tubes each having an inner diameter of 2 mm into a high frequency thermal plasma of 4 MHz and a power of 15 kW under an argon gas atmosphere containing 15% of oxygen. The phosphor amount was found to be 700 g in total after the treatment with the thermal plasma for 60 minutes. The teflon tubes for supplying the raw material into the reaction vessel were not found to have been plugged after the treatment. The phosphor particles obtained after the thermal plasma treatment were found to have an average particle diameter of 5 μm, and to contain as much as 93% of spherical phosphor particles meeting the definition of the present invention. The powder luminance of the resultant phosphor was found to be 98% of that of the raw material phosphor.

Example 6

A commercially available $Y_2O_3$:Eu phosphor, having an average particle size of 4.2 μm as measured by a Blaine method, was used in this experiment. The particular phosphor was dispersed in 0.1N aqueous solution of butyric acid, followed by stirring the dispersion for 30 minutes. After the stirring operation, the dispersion was filtered, followed by washing the residual powder with a flowing water so as to obtain the raw material. The raw material phosphor was subjected to a treatment with a thermal plasma. In this experiment, the raw material phosphor was dispersed in an argon gas flowing at a flow rate of 30 L/min so as to be supplied through four teflon tubes each having an inner diameter of 2 mm into a high frequency thermal plasma of 4 MHz and a power of 15 kW under an argon gas atmosphere containing 15% of oxygen. The phosphor amount was found to be 600 g in total after the treatment with the thermal plasma for 60 minutes. The teflon tubes for supplying the raw material into the reaction vessel were not found to have been plugged after the treatment. The phosphor particles obtained after the thermal plasma treatment were found to have an average particle diameter of 5 μm, and to contain as much as 90% of spherical phosphor particles meeting the definition of the present invention. The powder luminance of the resultant phosphor was found to be 100% of that of the raw material phosphor.

Example 7

A commercially available $Y_2O_3$:Eu phosphor, having an average particle size of 4.2 μm as measured by a Blaine method, was used in this experiment. The particular phosphor was dispersed in 0.1N aqueous solution of methacrylic acid, followed by stirring the dispersion for 30 minutes. After the stirring operation, the dispersion was filtered, followed by washing the residual powder with a flowing water so as to obtain the raw material. The raw material phosphor was subjected to a treatment with a thermal plasma. In this experiment, the raw material phosphor was dispersed in an argon gas flowing at a flow rate of 30 L/min so as to be supplied through four teflon tubes each having an inner diameter of 2 mm into a high frequency thermal plasma of 4 MHz and a power of 30 kW under an argon gas atmosphere containing 15% of oxygen. The phosphor amount was found to be 1000 g in total after the treatment with the thermal plasma for 60 minutes. The teflon tubes for supplying the raw material into the reaction vessel were not found to have been plugged after the treatment. The phosphor particles obtained after the thermal plasma treatment were found to have an average particle diameter of 5 µm, and to contain as much as 88% of spherical phosphor particles meeting the definition of the present invention. The powder luminance of the resultant phosphor was found to be 98% of the luminance of the raw material phosphor.

Example 8 and Comparative Examples 8–1 and 8–2

Figure 2:
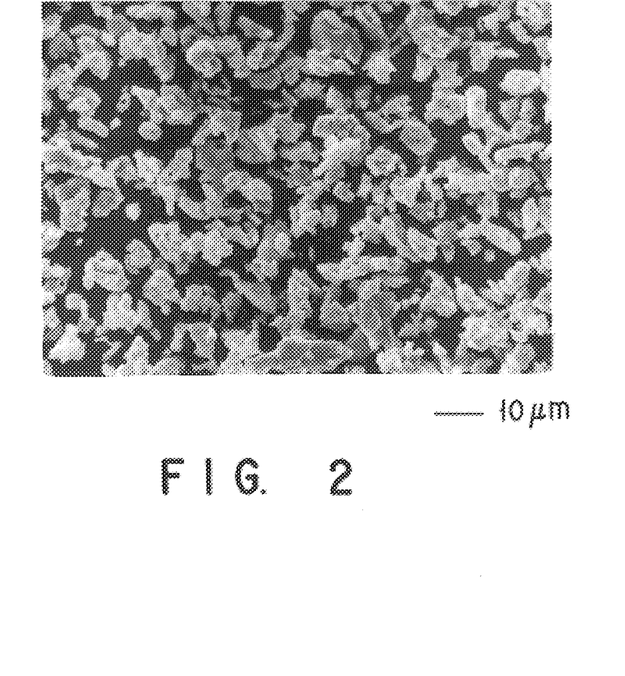
FIG. 2 is an electron micrograph showing a YAG:Tb raw material phosphor.
Figure 4:
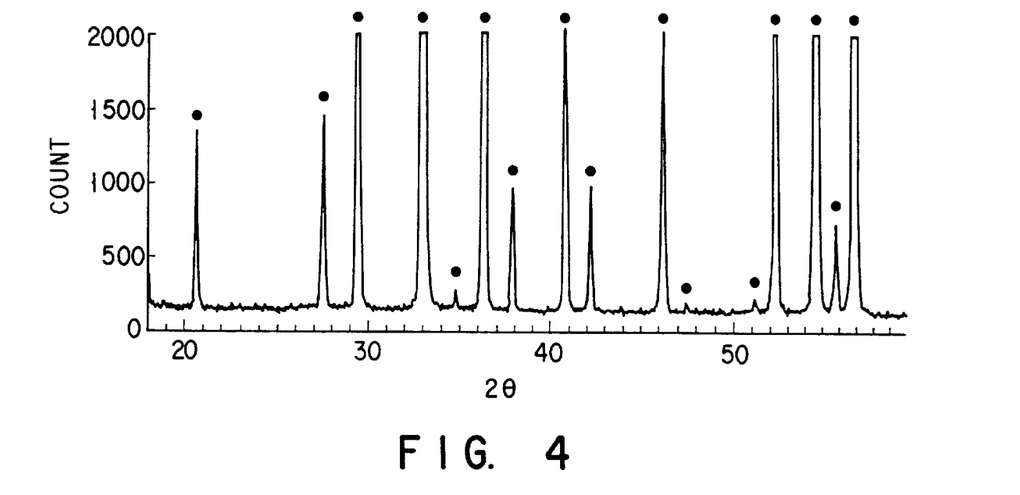
FIG. 4 is an X-ray diffraction (XRD) chart for the YAG:Tb raw material phosphor.

Prepared was an $Y_3(Al, Ga)_5O_{12}$:Tb phosphor manufactured by an ordinary flux method. FIG. 2 is a scanning electron micrograph showing the prepared phosphor powder. As seen from the micrograph, the phosphor powder consisted of aggregates of irregular particles. FIG. 4 shows an X-ray diffraction (XRD) pattern of the phosphor powder. It should be noted that the phosphor powder consisted of a cubic $Y_3Al_5O_{12}$ compound (c-YAG) alone having a garnet structure.

Figure 3:
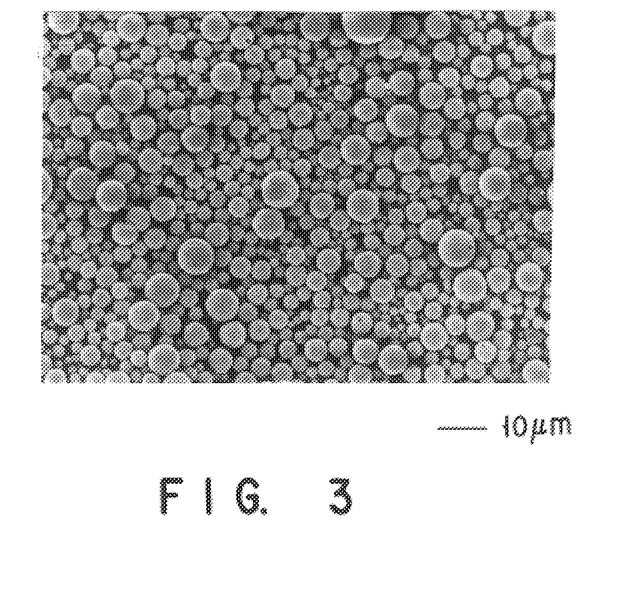
FIG. 3 is an electron micrograph showing a phosphor for Comparative Example 8–1.
Figure 5:
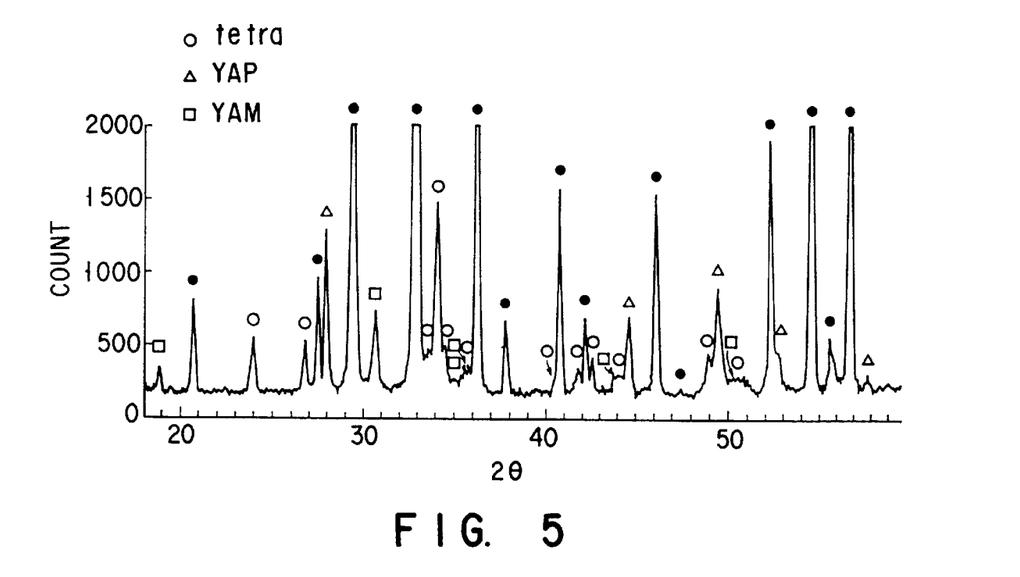
FIG. 5 is an XRD chart for the phosphor of Comparative Example 8–1.

The particular phosphor particles, which were used as a raw material, were subjected to a thermal plasma treatment under a frequency of 4 MHz and a power of 30 kW within an argon gas atmosphere containing 15% of oxygen, so as to obtain spherical phosphor particles (Comparative Example 8–1). FIG. 3 is a scanning electron micrograph showing the resultant phosphor powder. The average particle diameter of the spherical phosphor particles, which was determined from the micrograph, was 8.3 µm. FIG. 5 shows an XRD pattern of the phosphor particles. The phosphor particles were found to contain a tetragoul $Y_3Al_5O_{12}$ compound (tetra), an $YAlO_3$ compound (YAP) having a pervoskite structure, and a monoclinic $Y_4Al_2O_9$ compound (YAM) in addition to c-YAG referred to previously. The XRD peak values were found to be 28 for tetra., 23 for YAP, and 5 for YAM relative to 100 for the main peak value of c-YAG. The powder luminance of the phosphor was found to be about 50% based on the luminance of the raw material phosphor.

Figure 6:
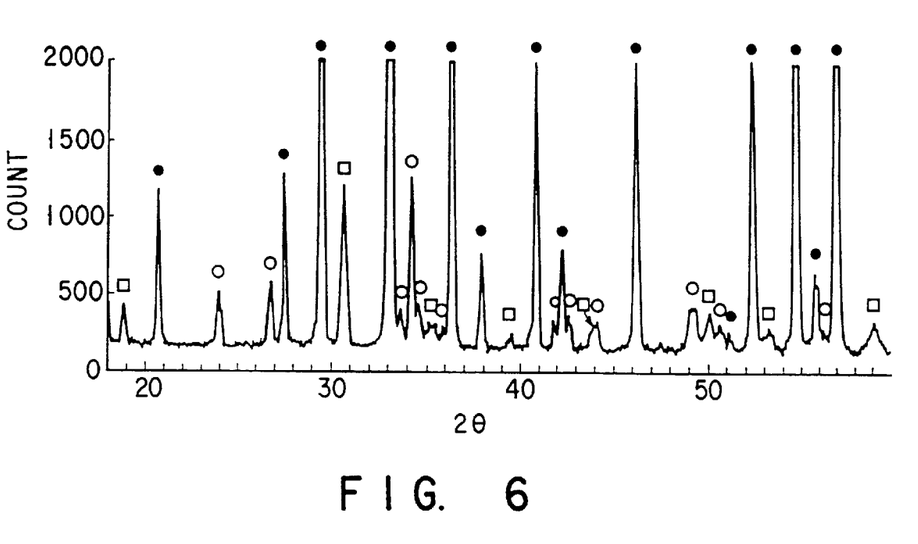
FIG. 6 is an XRD chart for the phosphor of Comparative Example 8–2.

Next, the phosphor powder for Comparative Example 8–1 was subjected to a heat treatment at 1450° C. for 2 hours. FIG. 6 shows an XRD pattern of the resultant phosphor powder (Comparative Example 8–2). The phosphor powder was found to contain tetra. and YAM in addition to c-YAG. The XRD peak values were found to be 32 for tetra., and 9 for YAM relative to 100 for the main peak value of c-YAG. The powder luminance of the phosphor was found to be about 75% based on the luminance of the raw material phosphor.

On the other hand, 12 parts by weight of fine particles of commercially available $Ga_2O_3$ were added to 100 parts by weight of the phosphor powder for Comparative Example 8–1, followed by subjecting the resultant mixture to a heat treatment at 1450° C. for 2 hours. The mixing amount of the $Ga_2O_3$ fine particles was determined on the basis of the XRD pattern for Comparative Example 8–1. No difference was recognized in the shape and surface condition between the resultant phosphor particles (Example 8) and those before the heat treatment. The XRD pattern of the resultant phosphor particles was compared with the pattern shown in FIG. 5. The peak intensities for both tetra. and YAM were found to be lower than those in FIG. 5, with the peak intensity of c-YAG found to be higher than that in FIG. 5. The powder luminance of the phosphor was found to be 98% of the luminance of the raw material phosphor.

Further, the phosphor powder for Example 8 was gradually etched, and the concentrations of the elements constituting the phosphor were measured by an ICP analysis of the solution during the etching process, with the results as shown in Table 1 below.

TABLE 1

| Ws (wt %) | ts/do (%) | Y (wt %) | Al (wt %) | Ga (wt %) | Tb (wt %) |
|---|---|---|---|---|---|
| 27 | 0 to 5 | 40.6 | 10.6 | 17.5 | 5.17 |
| 50 | 5 to 10 | 45.9 | 11.5 | 11.7 | 6.05 |
| 100 | 10 to 50 | 46.5 | 11.8 | 11.0 | 6.32 |

Notes:
Ws . . . The amount of phosphor dissolved by etching;
ts/do . . . Ratio of depth ts of the etched region from the surface to the original average particle diameter do.

A molar ratio of (Y+Tb)/(Al+Ga) was calculated by using the values shown in Table 1. It should be noted that the molar ratio (Y+Tb)/(Al+Ga) of $Y_3(Al, Ga)_5O_{12}$ having a stoichiometric composition is 0.6. In this Example, the particular molar ratio in the surface region covering 5% from the surface of the phosphor particle diameter was found to be 0.76, i.e., a deviation of less than 30% from the stoichiometric ratio. On the other hand, the molar ratio in question was found to be 0.93 in the intermediate region ranging between 5 and 10% from the surface and 0.95 in the inner region more than 10% from the surface of the phosphor particle diameter. What should be noted is that the deviation from the stoichiometric ratio was found to be 50% or more in the intermediate and the inner regions of the phosphor particle.

Example 9

A phosphor powder of $Y_2O_3$:Eu having an Eu content of 4.0% by weight and having an average particle size of 1.8 µm was subjected to a treatment with a high frequency thermal plasma of 4 MHz with a power of 30 kW under an argon gas atmosphere containing 15% of oxygen. The resultant phosphor powder was found to consist of spherical particles having an average particle diameter of 2.4 µm. The phosphor powder was subjected to a thermal treatment at 1400° C. for 3 hours.

The phosphor particles thus obtained was etched in a depth of 0.1 µm from the surface, and the Eu concentration in the surface region was found to be 5.2% by weight when measured by means of an ICP analysis of the solution. When the residual phosphor particles were completely dissolved, the Eu concentration which was measured similarly was found to be 3.4% by weight.

In the next step, the resultant phosphor powder and water glass were dispersed in an aqueous solution of barium nitrate, followed by coating a glass substrate having a transparent conductive film formed thereon with the resultant solution in a coating weight of 2.5 mg/cm$^2$ so as to form a phosphor film. The resultant phosphor film was excited with an electron beam under an accelerating voltage of 3 kV and a current density of 10 µA/cm$^2$ so as to measure the luminance of the phosphor film. The luminance was found to be 120% of the luminance of the commercially available $Y_2O_3$:Eu phosphor.

Example 10

A phosphor powder of $Gd_2O_2S$:Pr having a Pr concentration of 0.062 wt % and having an average particle size of 4.7 µm was subjected to a treatment with a high frequency thermal plasma of 4 MHz with a power of 30 kW under an argon gas atmosphere. The resultant phosphor powder was found to consist of spherical particles having an average particle diameter of 4.9 μm. Sulfur was added in an amount of 5 wt % to the phosphor powder after the treatment with the high frequency plasma, followed by subjecting the mixture to a heat treatment at 1300° C. for 2 hours under an argon gas atmosphere.

The phosphor particles thus obtained was etched in a depth of 0.1 μm from the surface, and the Pr concentration in the surface region was found to be 0.085 wt % when measured by means of an ICP analysis of the solution. When the residual phosphor particles were completely dissolved, the Pr concentration which was measured similarly was found to be 0.059 wt %.

In the next step, the resultant phosphor powder and water glass were dispersed in an aqueous solution of barium nitrate, followed by coating a glass substrate having a transparent conductive film formed thereon with the resultant solution in a coating weight of 2.5 mg/cm$^2$ so as to form a phosphor film. The resultant phosphor film was excited with an electron beam under an accelerating voltage of 3 kV and a current density of 10 μA/cm$^2$ so as to measure the luminance of the phosphor film. The luminance was found to be 105% of the luminance of the $Gd_2O_2S$:Pr phosphor used as the raw material.

Example 11

A phosphor powder of $Lu_2SiO_5$:Ce having a Ce concentration of 10 wt % and having an average particle size of 4.7 μm was subjected to a treatment with a high frequency thermal plasma of 4 MHz with a power of 20 kW under an argon gas atmosphere. The resultant phosphor powder was found to consist of spherical particles having an average particle diameter of 4.7 μm. Silicon dioxide ($SiO_2$) was added in an amount of 15 wt % to the phosphor powder after the treatment with the high frequency plasma, followed by subjecting the mixture to a heat treatment at 1450° C. for 3 hours under the air atmosphere.

The phosphor particles thus obtained were etched in a depth covering 5% from the surface of the phosphor particle diameter, and the concentrations of the elements constituting the phosphor were measured by means of an ICP analysis of the solution. The molar ratio of (Lu+Ce)/Si was found to be 2.3:1. When the residual phosphor particles were completely dissolved, the molar ratio (Lu+Ce)/Si which was measured similarly was found to be 3.5:1.

In the next step, the resultant phosphor powder and water glass were dispersed in an aqueous solution of barium nitrate, followed by coating a glass substrate having a transparent conductive film formed thereon with the resultant solution in a coating weight of 2.5 mg/cm$^2$ so as to form a phosphor film. The resultant phosphor film was excited with an electron beam under an accelerating voltage of 3 kV and a current density of 10 μA/cm$^2$ so as to measure the luminance of the phosphor film. The luminance was found to be 120% of the luminance of the raw material $Lu_2SiO_5$:Ce phosphor.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. A method of manufacturing a phosphor comprising the steps of:

heating a raw material consisting of a phosphor powder containing a phosphor host material and an activator within a thermal plasma at a temperature which permits partially evaporating a component of the raw material, followed by cooling to obtain spherical phosphor particles; and subjecting the resultant spherical phosphor particles to a heat treatment at 1300° to 1600° C.

2. The method according to claim 1, wherein the phosphor powder containing a phosphor host material and an activator is washed with an acid before the treatment with thermal plasma.

3. The method of claim 1, herein said heat treatment is performed at 1400° to 1600° C.

4. A method of manufacturing a phosphor comprising the steps of:

heating a raw material consisting of a phosphor powder containing a phosphor host material and an activator within a thermal plasma at a temperature which permits partially evaporating a component of the raw material, followed by cooling to obtain spherical phosphor particles; and mixing fine particles of an oxide of a component of the phosphor host material with the resultant spherical phosphor particles, followed by subjecting the resultant mixture to a heat treatment at 1200° to 1700° C.

5. The method according to claim 4, wherein said heat treatment is performed at 1300° to 1600° C.

6. The method according to claim 4, wherein said heat treatment is performed for 10 minutes to 30 hours.

7. The method according to claim 4, wherein said phosphor is represented by a general formula given below:

$$Ln_3M_5O_{12}:R \text{ or } Ln_2SiO_5:R$$

where Ln is at least one element selected from the group consisting of Y, Gd, La and Lu, M is at least one element selected from the group consisting of Al and Ga, and R is at least one element selected from the group consisting of lanthanide series, Cr, Ti and Fe.

8. The method according to claim 4, wherein the fine particles of the oxide have a particle diameter of 1 μm or less.

9. The method according to claim 4, wherein the phosphor powder containing a phosphor host material and an activator is washed with an acid before the treatment with thermal plasma.

* * * * *